United States Patent [19]

Yamawaki et al.

[11] Patent Number: 4,853,786

[45] Date of Patent: Aug. 1, 1989

[54] CSD IMAGE SENSOR AND METHOD OF DECREASING SMEAR BY THE USER THEREOF

[75] Inventors: Masao Yamawaki, Hyogo; Hiroshi Kawashima, Itami, both of Japan

[73] Assignee: Mitsubishi Denki Kabushiki Kaisha, Tokyo, Japan

[21] Appl. No.: 119,660

[22] Filed: Nov. 12, 1987

[30] Foreign Application Priority Data

Nov. 13, 1986 [JP] Japan .................................. 61-270699

[51] Int. Cl.$^4$ .............................................. H04N 3/14
[52] U.S. Cl. .......................... 358/213.29; 358/213.26; 358/213.31
[58] Field of Search ...................... 358/213.26, 213.29, 358/212, 213.27, 213.19, 213.31

[56] References Cited

U.S. PATENT DOCUMENTS

| | | | |
|---|---|---|---|
| 4,189,749 | 2/1980 | Hiroshima et al. | 358/213.19 |
| 4,430,672 | 2/1984 | Berger | 358/213.19 |
| 4,528,595 | 7/1985 | Eouzan | 358/213.29 |
| 4,684,993 | 8/1987 | Berger et al. | 358/213.29 |

*Primary Examiner*—Jin F. Ng
*Assistant Examiner*—Stephen Brinch
*Attorney, Agent, or Firm*—Gifford, Groh, Sheridan, Sprinkle and Dolgorukov

[57] ABSTRACT

In a solid image pickup element provided with photoelectric conversion elements arrayed in two dimensions, a scanning circuit for selecting each photoelectric conversion element to scan, a vertical transfer means and a horizontal transfer means for transferring a charge of the selected photoelectric conversion element vertically and horizontally respectively, a storage part for storing the transferred charge temporarily, the improvement comprising a driving means for transferring the charge from said photoelectric conversion elements to the storage part during a horizontal blanking period.

11 Claims, 8 Drawing Sheets

CSD IMAGE SENSOR AND METHOD OF DECREASING SMEAR BY THE USER THEREOF

BACKGROUND OF THE INVENTION

1. Field of the Invention

The present invention relates to a solid image pickup element and its driving method intended for decreasing a smear.

2. Description of the Prior Art

Because of the remarkable improvements taking place in solid image pick up elements, and the resulting refinement in area per pixel, operation at higher sensitivities is now required. To satisfy such requirements, a charge sweep device type image pickup element (hereinafter referred to as CSD type image pickup element) disclosed at page 100, February issue of DIGEST OF TECHNICAL PAPERS 1985, International Solid State Circuit Conference (ISSCC) by Kimata et al. has been developed.

Figure 6:
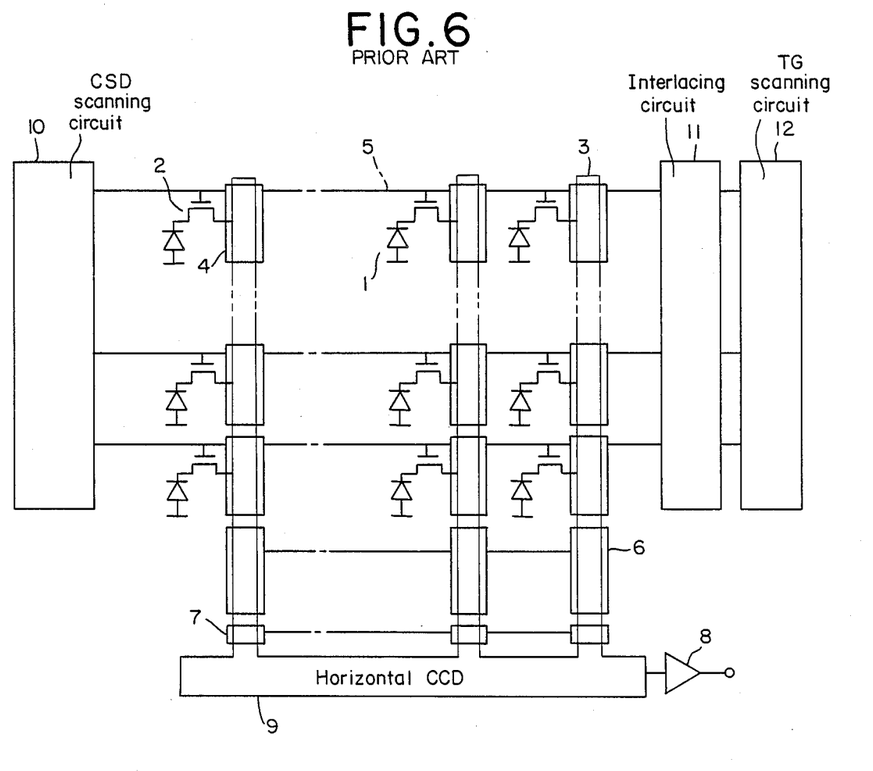
FIG. 6 is a block diagram representing a prior art example.
Figure 7:
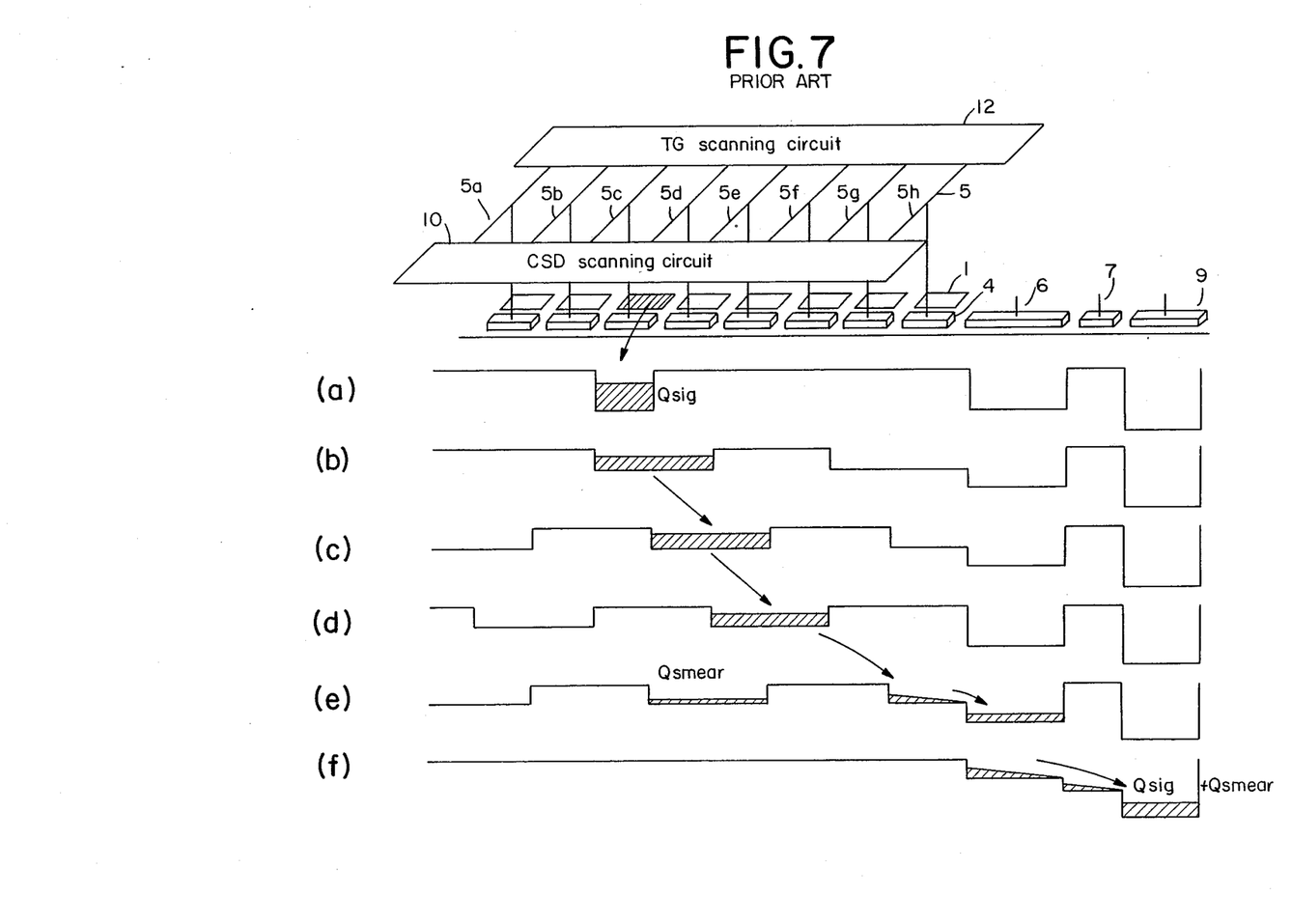
FIG. 7 is a pattern drawing showing a section of the image pickup element of FIG. 6 and potentials thereof.
Figure 8:
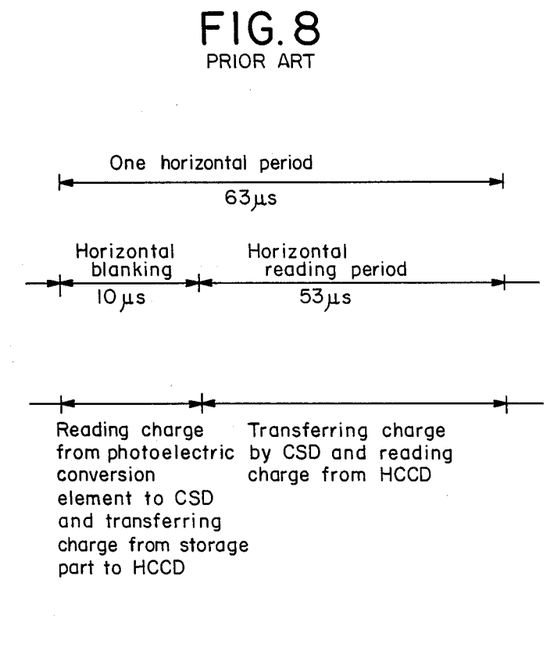
FIG. 8 is a conceptional drawing showing the operation during one horizontal period.

FIG. 6 is a block diagram showing a driving device for such conventional CSD type image pickup element. In the drawing, 1 denotes a photoelectric conversion element such as photodiode or the like arrayed in two dimensions, 2 denotes a transfer gate for reading a charge from the photoelectric conversion element, 3 denotes a CSD channel, 4 denotes a CSD transfer electrode, and the transfer gate 2 and the CSD transfer electrode 4 are constituted mostly of the identical electrode. A reference numeral 5 denotes a vertical scanning line, and all the CSD transfer electrodes 4 are connected horizontally through one vertical scanning line 5. A reference numeral 6 denotes a storage part for storing a charge transferred from the photoelectric conversion element 1 temporarily, 7 denotes a control gate of the storage part 6, 8 denotes an output part, 9 denotes a horizontal CCD (charge coupling device) arrayed horizontally, 10 denotes a CSD scanning circuit, 11 denotes an interlacing circuit, 12 denotes a TG scanning circuit. An operation will be described, next. FIG. 7 shows a vertical section of the CSD image pickup element and potentials typically. Now, when the transfer gate 2 during a horizontal blanking period is selected by the TG scanning circuit 12, a signal charge ($Q_{sig}$) is read to the CSD channel 3. In the drawing a vertical scanning line 5c is selected, and the charge is read from the photodiode 1 with hatching (FIG. 7(a)). Next, the charge $Q_{sig}$ is transferred by CSD during a horizontal reading period (FIG. 7(a) to (d)). In this case CSD is driven by the CSD scanning circuit 10 to operate similarly to a four-phase CCD. Then, the charge $Q_{sig}$ is stored in the storage part 6 and transferred to the horizontal CCD 9 through the control gate 7 during the next horizontal blanking period (FIG. 7 (f)). FIG. 8 represents one example of the operation during one horizontal period.

However, a smear $Q_{smear}$ due to stray component arises generally in the aforementioned solid image pickup element, which may cause a deterioration of the picture quality. That is, in the CSD type solid image pickup element, the signal charge from the photoelectric conversion element 1 is transferred to the storage part 6 by using one horizontal reading period entirely, therefore charges caused by the smear having arisen near the photoelectric conversion element 1 are all transferred to the storage part 6, thus joining with the signal charge. Consequently, the signal ($Q_{sig}+Q_{smear}$) becomes that in which a smear component is superposed, thus deteriorating the quality as a pickup image.

SUMMARY OF THE INVENTION

The invention has been done to remove the problems mentioned as above, and its object is to obtain a solid image pickup element and its driving method whereby a signal is transferred at high speed to prevent incoming of a smear, thereby securing a picture quality with less smear.

In a solid image pickup element provided with photoelectric conversion elements arrayed in two dimensions, a scanning circuit for selecting each photoelectric conversion element to scan, a vertical transfer means and a horizontal transfer means for transferring a charge of the selected photoelectric conversion element vertically and horizontally respectively, a storage part for storing the transferred charge temporarily, the invention comprises a driving means for transferring the charge from the photoelectric conversion elements to the storage part during a horizontal blanking period. Further, in a driving method for solid image pickup element whereby each photoelectric conversion element arrayed in two dimensions is selected to scan, a charge of the selected photoelectric conversion element is transferred both vertically and horizontally, the transferred charge is stored in a storage part temporarily, the invention comprises transferring the charge from the photoelectric conversion element to the storage part during a horizontal blanking period.

The driving means drives CSD so as to transfer a charge from the photoelectric conversion element to the storage part during a horizontal blanking period. Thus, the charge due to a smear can be swept out during a horizontal scanning period, and incoming into the signal can be prevented. Accordingly, the smear can be decreased and a picture quality will be enhanced.

DETAILED DESCRIPTION OF PREFERRED EMBODIMENTS

Figure 1:
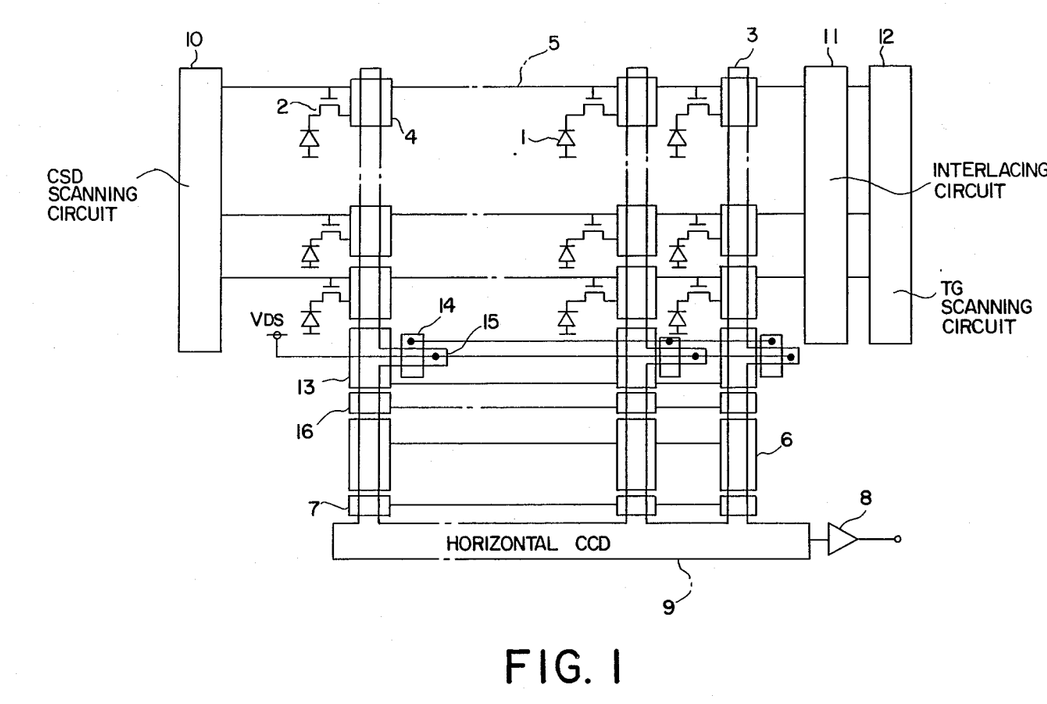
FIG. 1 is a block diagram representing one embodiment of the invention.
Figure 2:
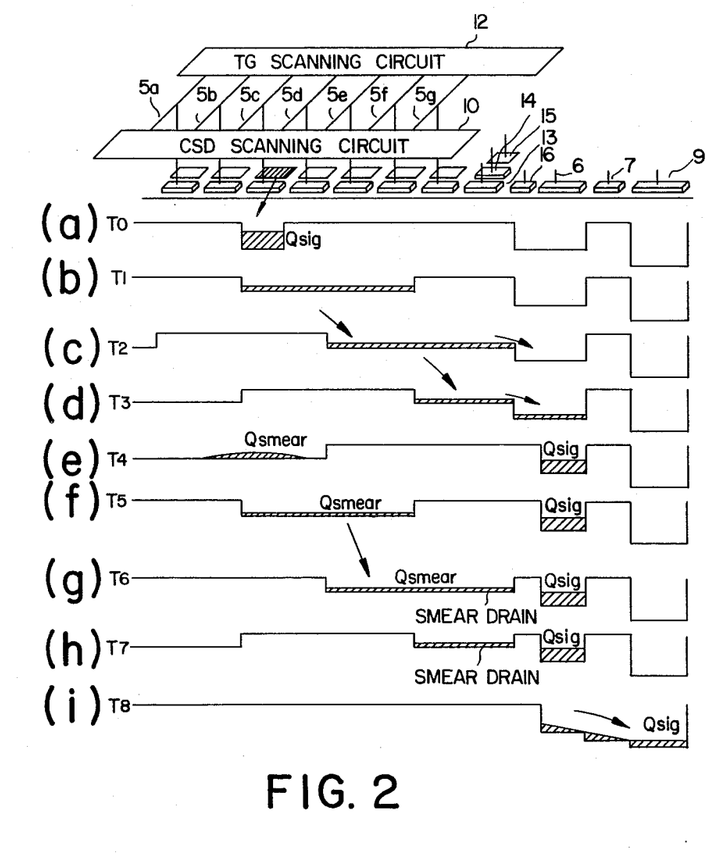
FIG. 2 is a pattern drawing showing a section of the image pickup element of FIG. 1 and potentials thereof.
Figure 3:
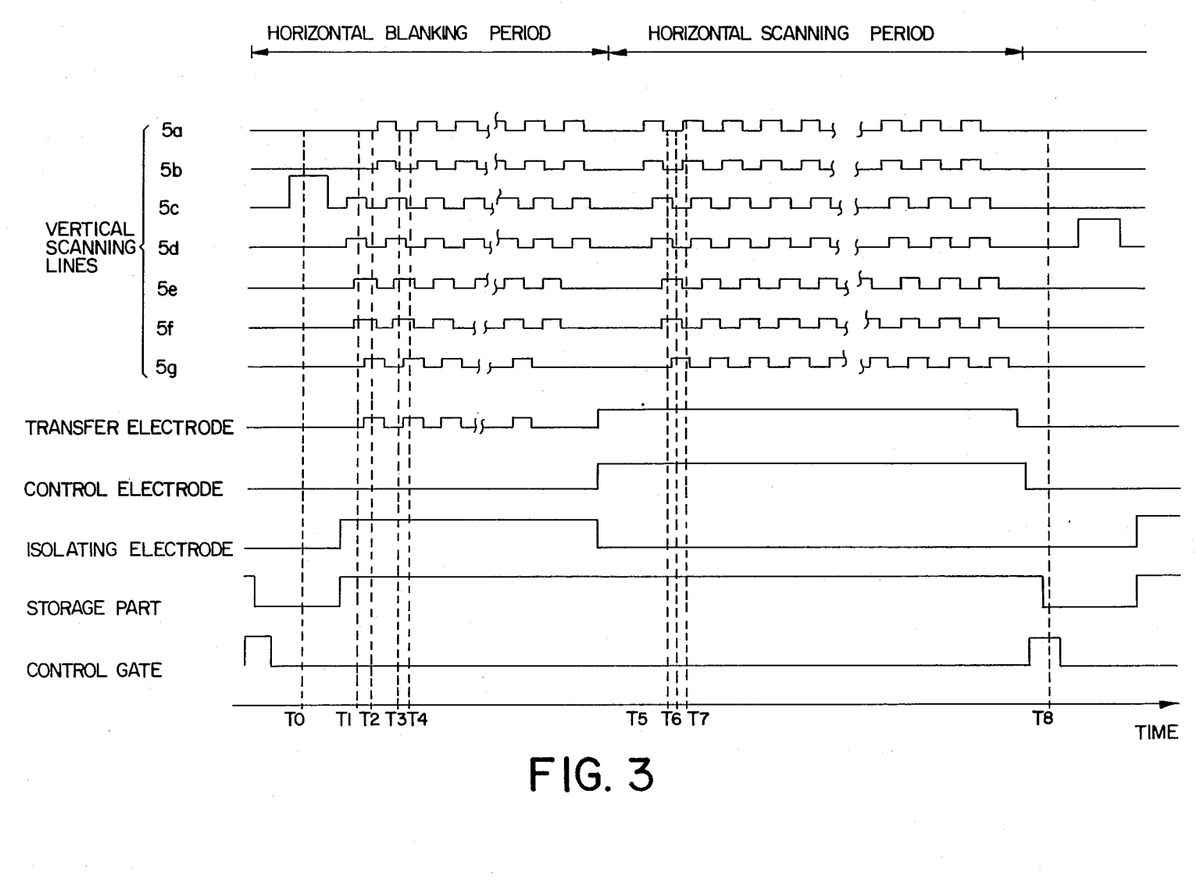
FIG. 3 is a timing chart showing an operation.
Figure 4:
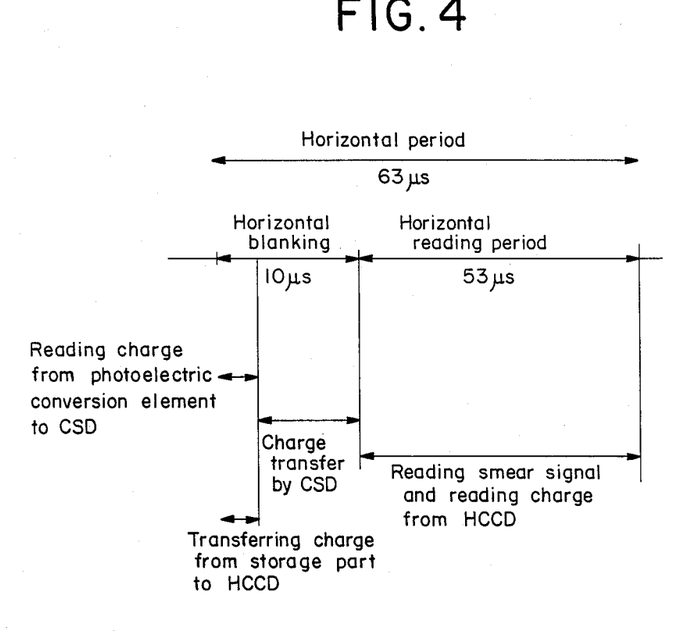
FIG. 4 is a conceptional drawing showing the operation during one horizontal period.

Preferred embodiments of the invention will now be described with reference to the accompanying drawings. Then, like reference characters represent like entities in the prior art, thereby omitting a repeated description. FIG. 1 represents one embodiment of the invention, wherein 13 denotes a transfer electrode of smear component, 14 denotes a smear sweep-out control electrode, 15 denotes a smear drain, 16 denotes an isolating electrode of the storage part 6. Then, FIG. 2 shows a section of CSD element and potentials typically, FIG. 3 is a timing chart illustrative of the operation, wherein channel potentials at times $T_0$ to $T_8$ are indicated, and a clock corresponding to each electrode of FIG. 1 is shown. FIG. 4 is a conceptional drawing representing one example of operation in the element during one horizontal period.

Then, a reading control means of a charge of the photoelectric conversion element 1 to the vertical transfer means, a driving means for transferring the charge to the storage part 6 during a horizontal blanking period, and a horizontal transfer means are constituted of the scanning circuits 10, 12 and the horizontal CCD 9.

The operation will be described next.

When the vertical scanning line 5c is selected, for example, at a time $t=T_0$, the charge $Q_{sig}$ is read to the CSD channel 3 from the photoelectric conversion element 1. The CSD then starts transferring at high speed. For high-speed transfer to realize in this case, the apparent number of transfer stages is decreased (times $T_1$ to $T_4$) by driving vertical two electrodes in a phase. The charge $Q_{sig}$ is then transferred to the storage gate 6 during the remaining horizontal blanking period. The CSD also restarts transferring during the horizontal scanning period, however, the smear charge $Q_{smear}$ is transferred in this case. The smear charge $Q_{smear}$ is swept out to a smear drain 15 by way of a transfer electrode 13 of the smear component and a smear sweep-out control electrode 14, therefore it is never mixed in the signal charge $Q_{sig}$. While the charge $Q_{sig}$ is transferred by CSD during the horizontal scanning period (about 53 $\mu$s) hitherto, it is transferred only during the horizontal blanking period (about 10 $\mu$s) in the embodiment as described, therefore the smear charge $Q_{smear}$ will be mixed in at 10 $\mu$s/(10 $\mu$s+5 $\mu$s) to 1/6 or so, thus realizing a decrease of smear. Then, a clock of high-speed frequency is required for high-speed transfer of CSD, however, since the vertical two CSD transfer electrodes 4 are driven in one phase, the driving frequency becomes ½ or so, and thus a configuration of the CSD scanning circuit 10 becomes easy.

Then, in the above-described embodiment, the two CSD electrodes are driven in a phase, however, the driving frequency becomes 1/n by driving n pieces in electrodes of a phase. In this case, an effective gate length becomes n times, therefore a transfer efficiency may deteriorate, and if so, then a channel potential will be controlled so as to secure the transfer perfectly in due direction by means of gate oxide film thickness, impurity injection and the like.

Figure 5:
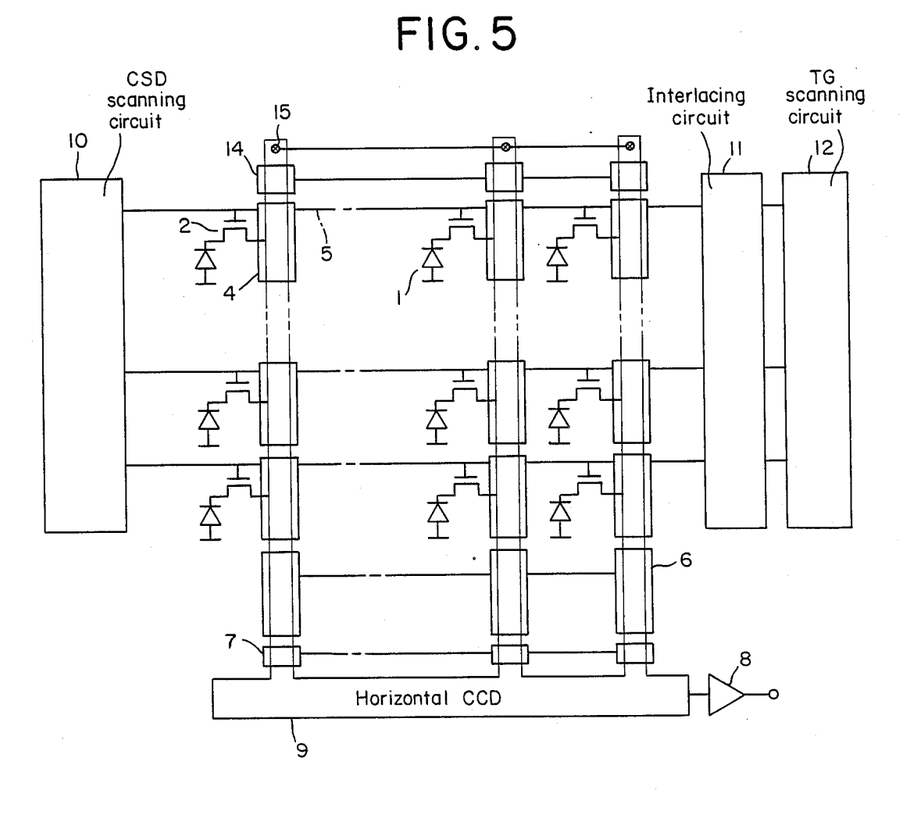
FIG. 5 is a block diagram representing another embodiment of the invention.

FIG. 5 represents another embodiment of the invention. While the smear drain 15 is provided near the storage part 6 in the aforementioned embodiment, it is provided on the reverse side of the horizontal CCD 9 in this embodiment. In this case, CSD transfers counter to the signal transfer when the smear is swept out, however, the direction of transfer can easily be controlled by the CSD scanning circuit 10. Further, the smear can also be swept out without driving CSD by applying an overflow drain entirely along the CSD channel 3. Even such construction is still effective in decreasing the smear as in the case of the above-described embodiment, thus enhancing the quality of a pickup image.

As described above, according to the invention, the time in which a smear charge is mixed with a signal charge will be shortened, the smear charge can be swept out, thus decreasing the smear and enhancing the quality of a pickup image.

What is claimed is:

1. In a solid image pickup element provided with CSD photoelectric conversion elements arrayed in two dimensions, a CSD scanning circuit for selecting each photoelectric conversion element to scan, a vertical transfer means and a horizontal transfer means for transferring a charge of the selected photoelectric conversion element vertically and horizontally respectively, a storage part for storing the transferred charge temporarily, the improvement comprising a driving means for transferring the charge from said photoelectric conversion elements to the storage part during a horizontal blanking period.

2. The device defined in claim 1, wherein said driving means includes:
   (a) a smear component transfer electrode connected to a CSD transfer electrode,
   (b) an isolating electrode connected to said transfer electrode,
   (c) a smear sweepout control electrode connected to said transfer electrode, and
   (d) a smear drain connected to said smear sweep out control electrode.

3. The device defined in claim 1, wherein said driving means includes:
   (a) a smear drain provided proximate said storage part on the reverse side of a horizontal CCD.

4. The solid image pickup element as defined in claim 1, the driving means sweeping out the charge generated by a smear signal by driving the vertical transfer means during a horizontal scanning period.

5. In a driving method for CSD solid image pickup element whereby each photoelectric conversion element arrayed in two dimensions is selected to scan, a charge of the selected photoelectric conversion element is transferred vertically and horizontally, the transferred charge is stored temporarily in a storage part, the improvement characterized in that the charge is transferred from said photoelectric conversion element to the storage part during a horizontal blanking period.

6. In a solid image pickup element provided with photoelectric conversion elements arrayed in two dimensions:
   (a) a scanning circuit for selecting each photoelectric conversion element to scan,
   (b) a vertical transfer means and a horizontal transfer means for transferring a charge of the selected photoelectric conversion element vertically and horizontally respectively,
   (c) a storage part for storing the transferred charge temporarily,
   (d) a driving means for transferring a charge from said photoelectric conversion elements to the storage part during a horizontal blanking period by driving a pair of said vertical transfer means in one phase during said horizontal blanking period.

7. The device defined in claim 6, wherein said driving means includes:
   (a) a smear component transfer electrode connected to a CSD transfer electrode,
   (b) an isolating electrode connected to said transfer electrode.
   (c) a smear sweep out control electrode connected to said transfer electrode, and
   (d) a smear drain connected to said smear sweep out control electrode.

8. The device defined in claim 6, wherein said driving means includes:

(a) a smear drain provided proximate said storage part on the reverse side of a horizontal CCD.

9. The solid image pickup element as defined in claim 6, the driving means sweeping out the charge generated by a smear signal by driving the vertical transfer means during a horizontal scanning period.

10. In a driving method for a CSD solid image pickup element whereby each photoelectric conversion element arrayed in two dimensions is selected to be scanned, the steps including:
(a) transferring vertically and horizontally a charge of the selected photoelectric conversion element,
(b) storing said charge temporarily in a storage part,
(c) transferring said charge to said storage part during a horizontal blanking period.

11. In a driving method for a solid image pickup element whereby each photoelectric conversion element arrayed in two dimensions is selected to scan, the steps including:
(a) transferring vertically and horizontally a charge of the selected photoelectric conversion elements at high speed to a storage part using plural electrodes to decrease the number of transfer stages, said transfer occuring entirely during a horizontal blanking period.

* * * * *